(12) United States Patent
Kiuchi

(10) Patent No.: US 9,513,846 B2
(45) Date of Patent: Dec. 6, 2016

(54) IMAGE FORMING APPARATUS, METHOD AND STORAGE MEDIUM CONTROLLING THE INSERTION OF INDEX SHEETS IN A PRINT JOB

(75) Inventor: Yohei Kiuchi, Kawasaki-shi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 68 days.

(21) Appl. No.: 13/492,583

(22) Filed: Jun. 8, 2012

(65) Prior Publication Data

US 2012/0327461 A1 Dec. 27, 2012

(30) Foreign Application Priority Data

Jun. 22, 2011 (JP) ................................. 2011-138087

(51) Int. Cl.
*G06F 3/12* (2006.01)
*G06K 15/00* (2006.01)
*G06K 15/02* (2006.01)

(52) U.S. Cl.
CPC ........... *G06F 3/1204* (2013.01); *G06F 3/1244* (2013.01); *G06F 3/1285* (2013.01); *G06K 15/005* (2013.01); *G06K 15/1822* (2013.01); *G06K 2215/0082* (2013.01)

(58) Field of Classification Search
CPC ............ G06K 15/055; G06K 15/1822; G06F 3/1285
USPC ........................................................ 358/1.15
See application file for complete search history.

(56) References Cited

U.S. PATENT DOCUMENTS

| 7,946,570 B2 | 5/2011 | Shinchi |
| 2003/0159114 A1 | 8/2003 | Nishikawa |
| 2007/0242282 A1 | 10/2007 | Hashimoto |
| 2008/0003035 A1* | 1/2008 | Yamamoto et al. ............ 400/62 |
| 2008/0019713 A1* | 1/2008 | Shinchi ................ G03G 15/655 399/38 |
| 2008/0260412 A1* | 10/2008 | Shinchi et al. .................. 399/82 |
| 2010/0118337 A1* | 5/2010 | Kiuchi ......................... 358/1.15 |
| 2010/0252984 A1* | 10/2010 | Maeda ....................... 270/58.23 |
| 2010/0272486 A1* | 10/2010 | Oeters .................. G03G 15/655 399/382 |

FOREIGN PATENT DOCUMENTS

| JP | 2000-330953 | 11/2000 |
| JP | 2003-296070 | 10/2003 |
| JP | 2004-202928 | 7/2004 |
| JP | 2006-248672 | 9/2006 |
| JP | 2007-283675 | 11/2007 |
| JP | 2008-23835 | 2/2008 |

OTHER PUBLICATIONS

Japanese Office Action issued on Apr. 17, 2015 during prosecution of related Japanese application No. 2011-138087. (Whole English-language translation included.)

\* cited by examiner

*Primary Examiner* — Barbara Reinier
*Assistant Examiner* — Henok A Shiferaw
(74) *Attorney, Agent, or Firm* — Fitzpatrick, Cella, Harper & Scinto

(57) ABSTRACT

An image forming apparatus receives print data from a client PC and analyzes a hierarchical structure relating to an item indicating a delimiter of a document included in the received print data. The image forming apparatus determines an insertion point at which an index sheet is inserted into a printed matter of the print data based on the results of analysis of the hierarchical structure. Then, the image forming apparatus inserts the index sheet into the printed matter at the determined insertion point and outputs the resulting printed matter.

9 Claims, 17 Drawing Sheets

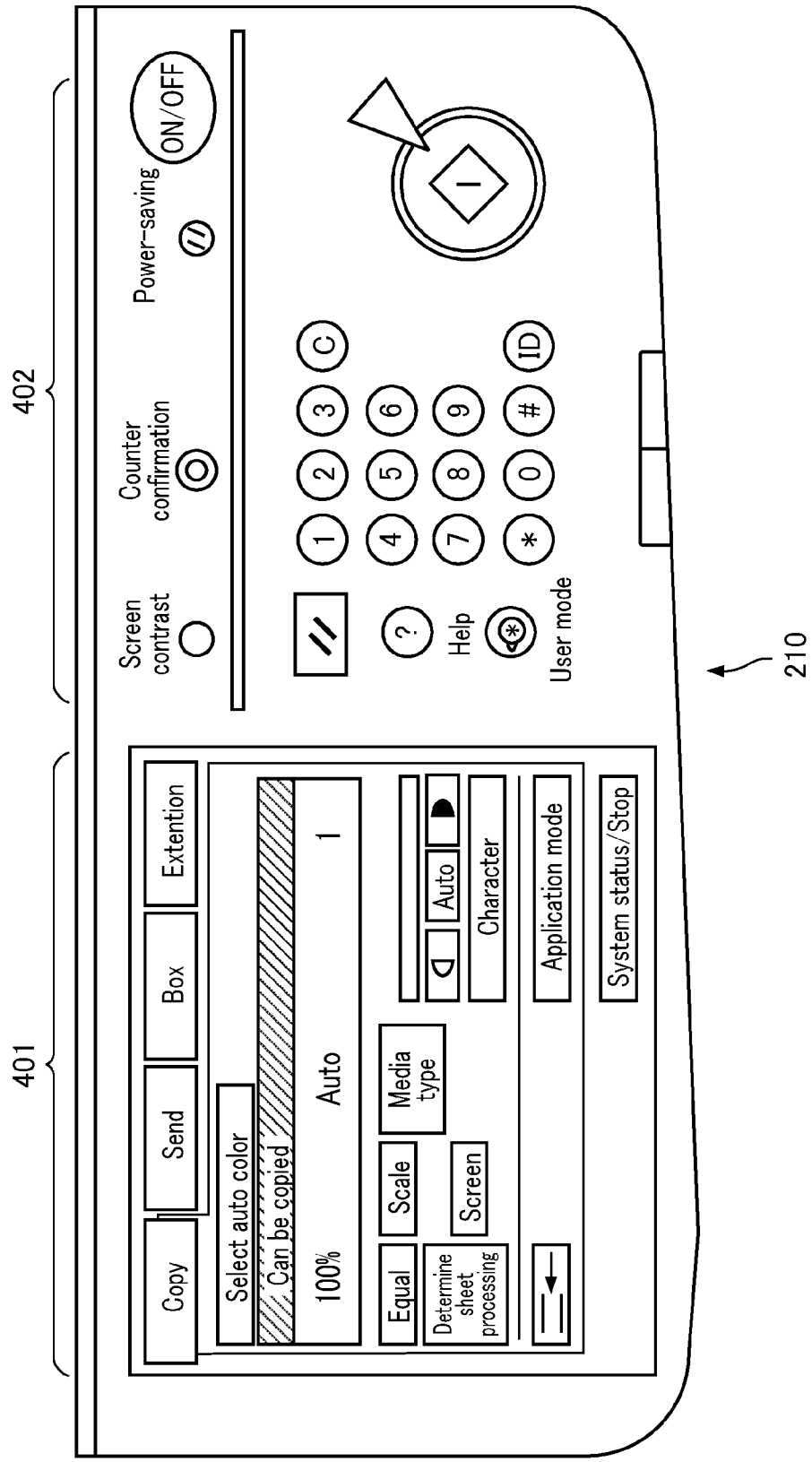

FIG. 6

```
OutlinedDocument.pdf
  Title              Page 1
  Chapter 1          Pages 2 to 5
  Chapter 1.1        Pages 6 to 8
  Chapter 1.2        Pages 9 to 14
  Chapter 1.2.1      Page 15
  Chapter 1.2.2      Pages 15 to 17
  Chapter 1.3        Page 17
  Chapter 2          Page 17
  Chapter 2.1        Page 17
  Chapter 2.1.1      Pages 17 and 18
  Chapter 3          Pages 19 and 20
```

FIG. 7

```
%PDF-1.7
...

21 0 obj <<
 /Type /Outlines /First 22 /Last 31 /Count 3
>>
22 0 obj <<
 /Tytle (Chapter 1) /Parent 21 /Next 28 /First 23 /Last 27 /Count 3
 /Dest [2 0 R /XYZ null 777 null]
>>
23 0 obj <<
 /Tytle (Chapter 1.1) /Parent 22 /Next 24 /Dest [6 0 R /XYZ null 777 null]
>>
24 0 obj <<
 /Tytle (Chapter 1.2) /Parent 22 /Prev 23 /Next 27 /First 25 /Last 26 /Count 2
 /Dest [9 0 R /XYZ null 777 null]
>>
25 0 obj <<
 /Tytle (Chapter 1.2.1) /Parent 24 /Next 26 /Dest [15 0 R /XYZ null 777 null]
>>
26 0 obj <<
 /Tytle (Chapter 1.2.2) /Parent 24 /Prev 25 /Dest [15 0 R /XYZ null 777 null]
>>
27 0 obj <<
 /Tytle (Chapter 1.3) /Parent 22 /Prev 24 /Dest [17 0 R /XYZ null 777 null]
>>
28 0 obj <<
 /Tytle (Chapter 2) /Parent 21 /Next 31 /Prev 22 /First 29 /Last 29 /Count 1
 /Dest [17 0 R /XYZ null 777 null]
>>
29 0 obj <<
 /Tytle (Chapter 2.1) /Parent 28 /First 30 /Last 30 /Count 1
 /Dest [17 0 R /XYZ null 777 null]
>>
30 0 obj <<
 /Tytle (Chapter 2.1.1) /Parent 29 /Dest [17 0 R /XYZ null 777 null]
>>
31 0 obj <<
 /Tytle (Chapter 3) /Parent 21 /Prev 28 /Dest [19 0 R /XYZ null 777 null]
>>

...
%%EOF
```

IMAGE FORMING APPARATUS, METHOD AND STORAGE MEDIUM CONTROLLING THE INSERTION OF INDEX SHEETS IN A PRINT JOB

BACKGROUND OF THE INVENTION

1. Field of the Invention

The present invention relates to an image forming apparatus, a method for controlling the same, and a storage medium.

2. Description of the Related Art

Image forming apparatuses that perform processing for dividing a document body by inserting an index sheet on any page designated by a user have been proposed. An index sheet has a shape in which an index portion (tab) is added to a normal rectangular sheet. In general, a set of index sheets is configured by a plurality of index sheets having an index portion located in a different position. In a set of index sheets, a plurality of index sheets having an index portion located in a different position is stacked together such that the positions of the index portions are sequentially displaced from each other. Since the index portion provided in each index sheet is presented out of a normal sheet size, sheets of paper can be divided into chapters. A user who picks up an output matter into which index sheets are inserted is capable of referencing any page based on the position of the index portion of each index sheet.

The image forming apparatus feeds the first index sheet such that the position of the index portion of the leading index sheet to be printed in a print job is in its uppermost position. When the number of index sheets for insertion becomes different from the number of index sheet bundles, the image forming apparatus discharges the remaining index sheets out of the apparatus body upon completion of the print job, and performs a cue of the head of a set of index sheets for the next print job. This process is referred to as a "remaining index sheet discharging process".

In recent years, multiple types of index sheets have been inserted into any page designated by a user to thereby divide a document body into a document structure having multiple levels such as chapters or clauses. For example, Japanese Patent Laid-Open No. 2006-248672 discloses an image forming apparatus that distinguishes a printed matter using index sheets each having a different color in accordance with the designation of a chapter/clause delimiter by a user.

Japanese Patent Laid-Open No. 2007-283675 discloses an image forming apparatus that detects index data of a document to be printed and analyzes the structure of the document to thereby display the content of indexes in response to the results of analysis. A user of the image forming apparatus designates an index based on the displayed content of indexes.

In the conventional image forming apparatuses disclosed in Japanese Patent Laid-Open No. 2006-248672 and Japanese Patent Laid-Open No. 2007-283675, when index sheets are inserted into a print job having a multi-level document structure, a user needs to explicitly designate which page of the print job corresponds to a chapter/clause delimiter. Thus, when print data having a complex document structure or print data having multiple chapters/clauses is printed, a workload of a user significantly increases, resulting in a reduction in printing efficiency and a cause of operational mistakes.

SUMMARY OF THE INVENTION

The image forming apparatus of the present invention analyzes the hierarchical structure of a document included in print data to be printed, and automatically determines an insertion point at which an index sheet is inserted into a printed matter based on the results of analysis.

According to an aspect of the present invention, an image forming apparatus is provided that includes a reception unit configured to receive print data; an analysis unit configured to analyze a hierarchical structure relating to an item indicating a delimiter of a document included in the received print data; a determination unit configured to determine an insertion point at which an index sheet is inserted into a printed matter of the print data based on the results of analysis of the hierarchical structure; and an output unit configured to insert the index sheet into the printed matter at the determined insertion point and output the resulting printed matter.

Further features of the present invention will become apparent from the following description of exemplary embodiments with reference to the attached drawings.

BRIEF DESCRIPTION OF THE DRAWINGS

FIGS. 4A and 4B are diagrams illustrating an exemplary configuration of an operation unit of the image forming apparatus.

FIG. 6 is a diagram illustrating an exemplary document structure of print data.

FIG. 7 shows an exemplary description of a document structure of print data by means of Outlines in PDF.

DESCRIPTION OF THE EMBODIMENTS

Figure 1:
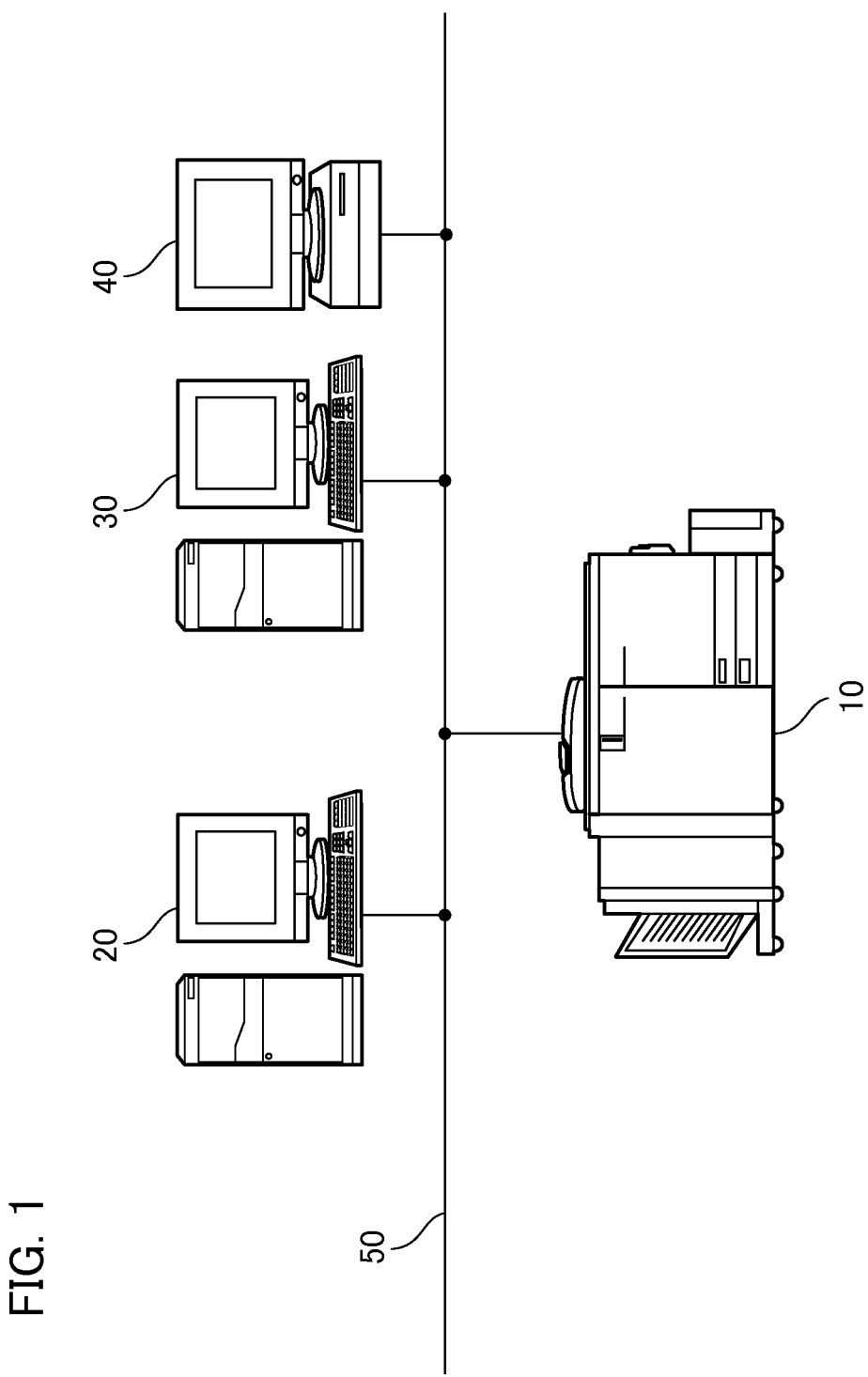
FIG. 1 is a diagram illustrating an example of a system configuration of the present embodiment.

FIG. 1 is a diagram illustrating an example of a system configuration of the present embodiment. The system shown in FIG. 1 includes an image forming apparatus 10, a print server 20, a file server 30, and a client PC (Personal Computer) 40. The image forming apparatus 10, the print server 20, the file server 30, and the client PC 40 are communicably connected via a network 50. The network 50 is, for example, LAN (Local Area Network), WAN (Wide Area Network), or the like.

The image forming apparatus 10 is the image forming apparatus of the present embodiment. The image forming apparatus 10 is an MFP (Multi Function Peripheral) having various functions such as scanning, printing, copying, or the like. As an operation specific to the present embodiment, the image forming apparatus 10 receives an input of a print job from the client PC 40. A print job refers to a combination of a series of processing starting from print processing after receiving print data to necessary end processing performed by the image forming apparatus 10. In the present embodiment, a print job includes document data having a multi-level document structure (hierarchical structure). Based on the input print job, the image forming apparatus 10 inserts an index sheet into a printed matter corresponding to document data included in the print job print and outputs the resulting printed matter.

The print server 20 manages input print jobs and the image forming apparatus 10 connected via the network 50. The print server 20 not only monitors the state of the image forming apparatus 10 and the state of all of the print jobs and but also performs controls such as temporary pause of a print job, setting changes, printing restart, or replication, transfer, or deletion of job, and the like.

The file server 30 stores database relating to variable data used in variable printing. The file server 30 stores customer database including customer data such as destination, address, name, and the like. The client PC 40 has functions for editing application files and providing print instructions. Also, the client PC 40 has functions for monitoring the image forming apparatus 10 and print jobs, which are managed by the print server 20, and for assisting the control thereof. A client PC displays a job input screen, and inputs a job (for example, print job) to the image forming apparatus 10 in response to a user's operation on the job input screen. A user of the client PC 40 can confirm the status of a job by utilizing the client PC 40.

Figure 2:
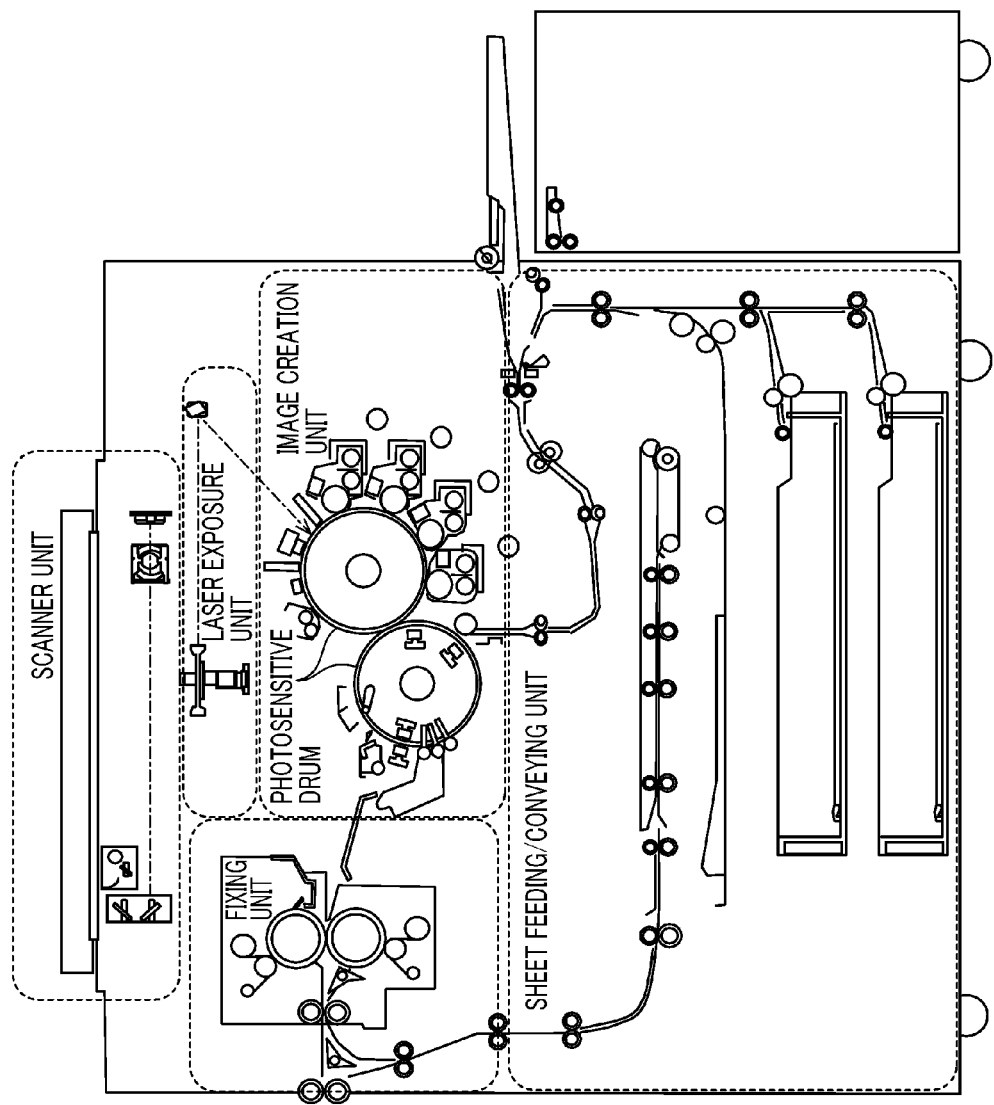
FIG. 2 is a diagram illustrating an exemplary configuration of an image forming apparatus.

FIG. 2 is a diagram illustrating an exemplary configuration of the image forming apparatus. The image forming apparatus 10 shown in FIG. 2 is an MFP. The image forming apparatus 10 includes a scanner unit, a laser exposure unit, a photosensitive drum, an image creation unit, a fixing unit, a sheet feeding/conveying unit, and a printer control unit (not shown) for controlling these units.

The scanner unit optically reads an original image by applying illumination to an original laid on a platen glass, and converts the image into an electrical signal to create image data. The laser exposure unit makes a beam of light such as laser light modulated in accordance with the image data incident on a rotation polygon mirror (polygon mirror) rotating at an equal angular velocity and illuminates a reflected scan light to the photosensitive drum.

The image creation unit executes electro-photographic processes. In other words, the image creation unit drives the rotation of the photosensitive drum to be charged with a charger unit, develops a latent image formed on the photosensitive drum by the laser exposure unit with the toner, and transfers a toner image onto a sheet. Also, the image creation unit collects the minute toner remaining on the photosensitive drum without being transferred. While the sheet is wound around a predetermined position of a transfer belt and rotated four times, the developing units (developing stations) having the toners of magenta (M), cyan (C), yellow (Y) and black (K) repeatedly perform the electro-photographic processes in succession. After four rotations, the sheet onto which the full color toner image of four colors is transferred is released from a transfer drum and conveyed from the transfer drum to the fixing unit.

The fixing unit is composed of a combination of rollers and belts. The fixing unit contains a heat source such as a halogen heater. The toner on the sheet onto which the toner image is transferred by the image creation unit is fused and fixed by heat and pressure.

The sheet feeding/conveying unit includes one or more sheet depots (sheet feeding stages) represented by a sheet cassette or a paper deck. In the present embodiment, a predetermined sheet feeding stage functions as a sheet feeding unit on which an index set is placed. An index set includes a plurality of index sheets stacked together such that index portions provided in the respective index sheets are sequentially displaced from each other.

The sheet feeding/conveying unit separates one sheet from a plurality of sheets stored in the sheet depot in accordance with an instruction of the printer control unit, and conveys it to the image creation unit and the fixing unit. The sheet is wound around the transfer drum of the image creation unit, and after being rotated four times, conveyed to the fixing unit. While the sheet is rotated four times, the toner image of each color of YMCK is transferred onto the sheet. Also, in the case where the image is formed on both sides of the sheet, the sheet having passed through the fixing unit is controlled to pass through the conveying path to the image creation unit again.

The printer control unit communicates with an MFP control unit (not shown) for controlling the overall image forming apparatus 10 serving as an MFP to execute the control in accordance with an instruction from the MFP control unit. Also, the printer control unit controls the overall system to operate smoothly in harmony while managing the status of each of the scanner unit, the laser exposure unit, the image creation unit, the fixing unit, and the sheet feeding/conveying unit.

Figure 3:
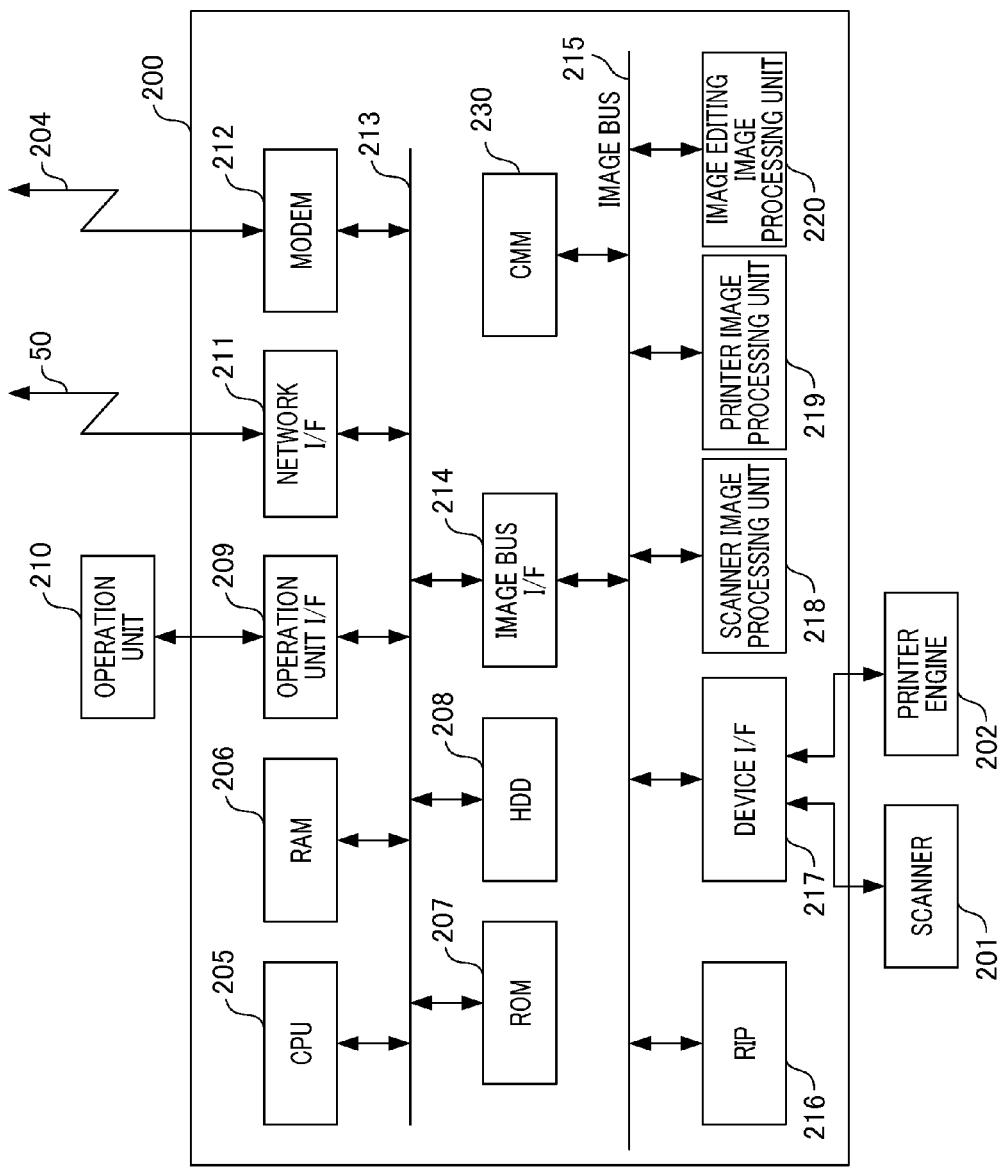
FIG. 3 is a diagram illustrating an exemplary configuration of a control unit provided in the image forming apparatus.

FIG. 3 is a diagram illustrating an exemplary configuration of a control unit provided in the image forming apparatus. A control unit 200 is connected to a scanner 201 that is an image input device and a printer engine 202 that is an image output device, and makes the control for the reading and printout of image data. Also, the control unit 200 is connected to the network 50 or public line 204, and makes the control for inputting and outputting image information or device information via the network 50. A method for controlling the image forming apparatus of the present embodiment is realized by the function of the control unit 200.

A CPU (Central Processing Unit) 205 provided in the control unit 200 is a central processing unit for controlling the overall image forming apparatus 10. A RAM (Random Access Memory) 206 is a system work memory where the CPU 205 operates. The RAM 206 is also an image memory for temporarily storing the input image data.

A ROM (Read Only Memory) 207 is a boot ROM storing a boot program of the system. An HDD (Hard Disk Drive) 208 is a hard disk drive. The HDD 208 stores the system software for various kinds of processes, the input image data, and the like. Also, the HDD 208 stores a computer program for realizing a method for controlling the image forming apparatus of the present embodiment in advance. The CPU 205 reads out a computer program stored in the HDD 208 to the RAM 206 for execution. An operation unit I/F (Interface) 209 is an interface unit for an operation unit 210 having a display screen that can display the image data and the like. The operation unit I/F 209 outputs the operation screen data to the operation unit 210. Also, the operation unit I/F 209 conveys information input from the operation unit 210 by the operator to the CPU 205.

A network interface 211 includes, for example, a LAN card or the like. The network interface 211 is connected to the network 50 to input/output information to/from an external device. A modem 212 is connected to the public line 204 to input/output information to/from an external device. The above units are arranged over a system bus 213.

An image bus I/F 214 is an interface for connecting the system bus 213 and an image bus 215 for transferring image data at high speed, and a bus bridge for converting the data structure. A raster image processor 216, a device I/F unit 217, a scanner image processing unit 218, a printer image processing unit 219, an image editing image processing unit 220, and a CMM 230 are connected over the image bus 215, where CMM is an abbreviation for Color Management Module.

An RIP (Raster Image Processor) 216 is a raster image processor. The RIP 216 expands a page description language (PDL) to a raster image. In general, RIP processing is used in two meanings, i.e., interpretation processing for converting PDL into intermediate data (DL) and rendering processing for converting PDL into a raster image. In the present embodiment, a description will be given below on the assumption that data processed by RIP is expanded into a raster image for the convenience of explanation. However, it is a matter of course that a temporal conversion of RIP data into intermediate data (DL) is also included in the present invention. The device I/F unit 217 connects the scanner 201 or the printer engine 202 to the control unit 200 to make the conversion of image data for the synchronous system and the asynchronous system.

The scanner image processing unit 218 performs various kinds of processing such as correction, manipulation and edit for the image data input from the scanner 201. The printer image processing unit 219 performs the processing such as correction and resolution conversion for the image data to be printed out according to the printer engine. The image editing image processing unit 220 performs various kinds of image processing such as rotation of image data, compression or decompression of image data, and the like. The CMM (Color Management Module) 230 is a dedicated hardware module for performing a color conversion process (also called a color space conversion process) for the image data, based on a profile or calibration data. The profile is information on a function of converting the color image data represented in a color space dependent on a device into another color space (e.g., Lab) not dependent on a device. The calibration data is data for modifying the color reproduction characteristics of the scanner unit 201 or the printer engine 202 in a color multi-function printer 3.

Figure 4B:
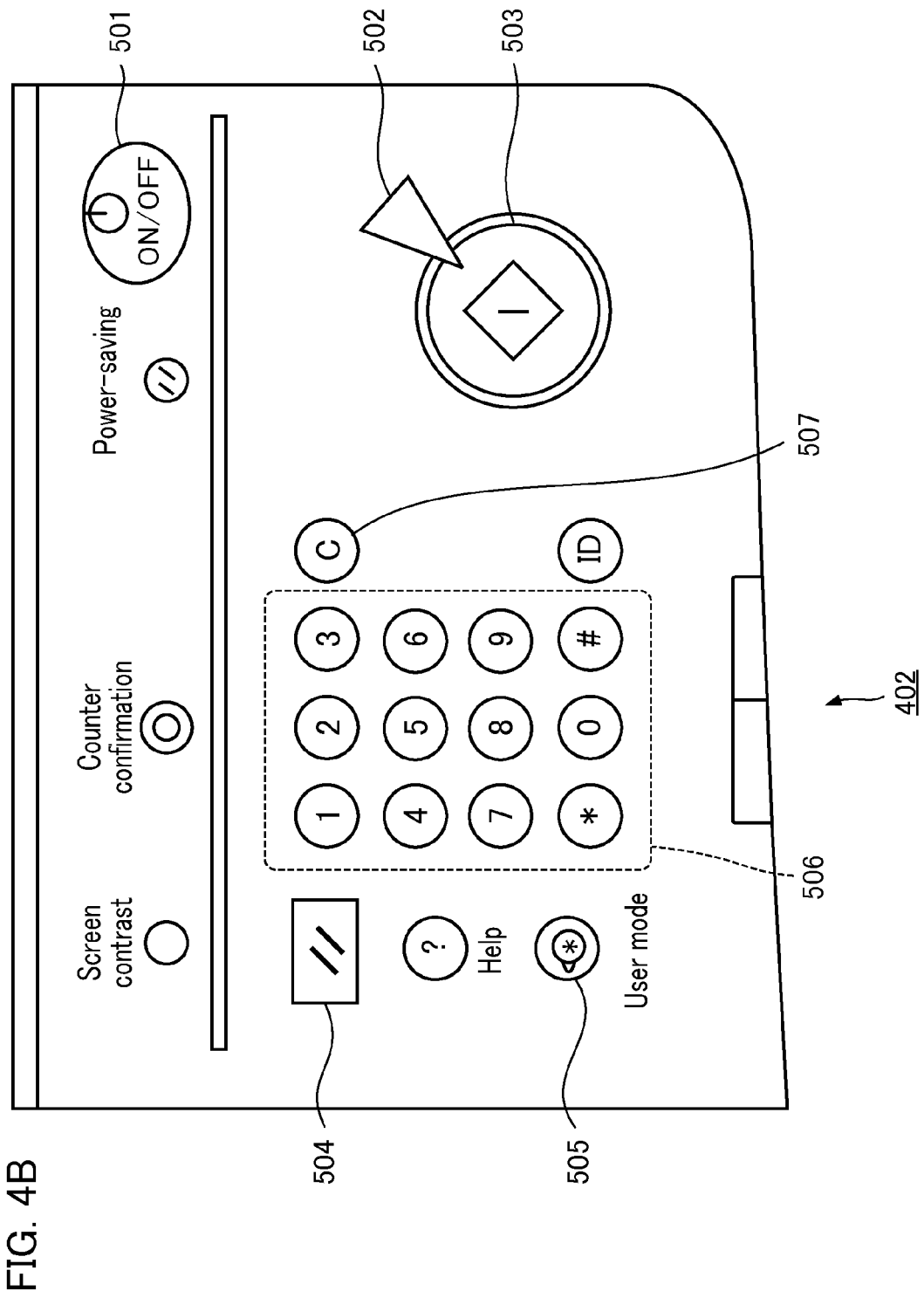

FIGS. 4A and 4B are diagrams illustrating an exemplary configuration of an operation unit of the image forming apparatus. FIG. 4A shows an external appearance of the operation unit 210. FIG. 4B is a partially enlarged diagram illustrating the operation unit 210 shown in FIG. 4A. As shown in FIG. 4A, the operation unit 210 includes a key input unit 402 that is capable of accepting a user's operation using hard keys. The operation unit 210 has a touch panel unit 401 as an example of a display unit which is capable of accepting a user's operation using soft keys (display keys).

As shown in FIG. 4A, the key input unit 402 includes an operation unit power supply switch 501. The CPU 205 executes control for selectively switching between a stand-by mode and a sleep mode in response to the user's operation of the switch 501. The stand-by mode is a normal operation state and the sleep mode is an interruption waiting state, in which a program is stopped to suppress power consumption, for network printing or facsimile. When a main power supply switch (not shown) for providing power to the overall system is in its ON state, the CPU 205 controls such that the user's operation of the switch 501 can be accepted.

A start key 503 is a key that is capable of accepting an instruction from a user for causing a print device to start job processing instructed by the user, such as a copying operation, or a transmitting operation of a job to be processed. A stop key 502 is a key that is capable of accepting an instruction from a user for causing a print device to interrupt processing for the accepted job. A ten key 506 is a key for setting the entries of various settings. A clear key 507 is a key for clearing various parameters such as entries set by a user via the key 506. A reset key 504 is a key for invalidating all of the various settings for a job to be processed set by a user. Also, the reset key 504 is a key for accepting an instruction from a user to return a set value to its default state. A user mode key 505 is a key for displaying a system setting screen for each user.

Figure 5:
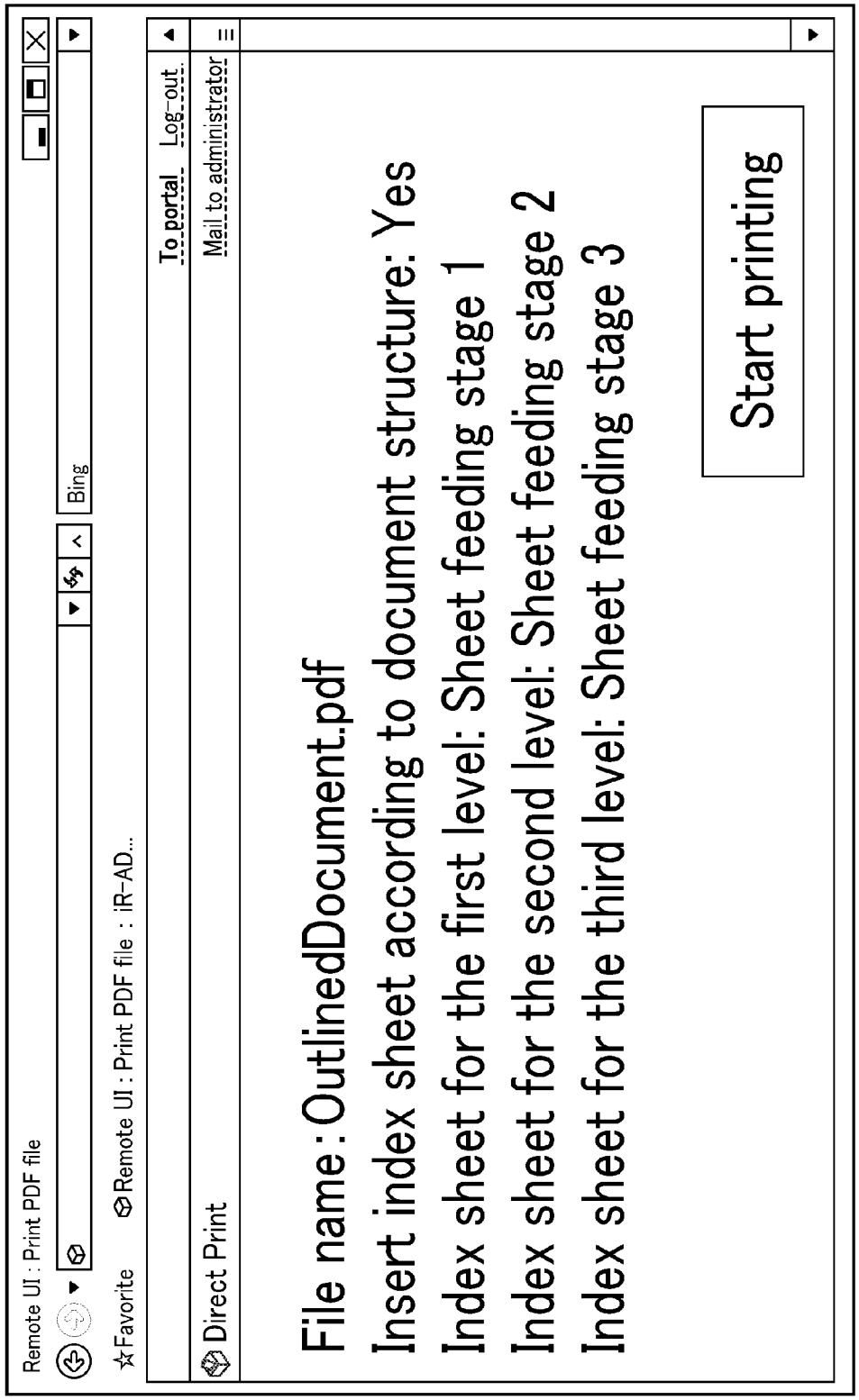
FIG. 5 is a diagram illustrating an exemplary job input screen.

FIG. 5 is a diagram illustrating an exemplary job input screen to be displayed by a client PC. In the present embodiment, a user can designate the file name of print data, whether or not an index sheet is inserted according to a document structure, and the sheet feeding stage for an index sheet to be used for each level on the job input screen. The client PC 40 generates designation information in response to the user's designation operation on the job input screen. Designation information is correspondence information between a sheet feeding stage and a level included in the hierarchical structure and is information for designating which sheet feeding unit to feed an index sheet to be inserted into an insertion point corresponding to each level. The client PC 40 generates a print job including designation information and inputs the print job to the image forming apparatus 10. In this way, a sheet feeding stage for an index sheet to be used for each level is designated for the image forming apparatus 10. The CPU 205 included in the image forming apparatus 10 sequentially feeds the index sheets included in the index set placed on the sheet feeding stage and inserts the fed index sheets into the insertion points corresponding to the respective levels in accordance with designation information included in a print job.

The item "file name" is an item for designating the name of a file to be printed by the image forming apparatus 10. A file designated as the "file name" is transmitted as print data from the client PC 40 to the image forming apparatus 10 via the network 50. The CPU 205 included in the image forming apparatus 10 functions as a reception unit that receives print data transmitted from the client PC 40. Then, the CPU 205 performs print processing for the received print data as one print job. The "insert index sheet according to document structure" is an item for designating whether or not an index sheet is inserted into an output matter according to the document structure of print data. When the item "YES" is designated in the designation item, a sheet feeding stage for an index sheet to be used for each level can be designated.

The job input screen has three items "index sheet for the first level", "index sheet for the second level", and "index sheet for the third level" as items for designating a sheet feeding stage for an index sheet to be used for each level. The "index sheet for the first level" is an item for designating a sheet feeding stage on which a set of index sheets to be inserted into the first level of a document structure is placed. The "index sheet for the second level" is an item for designating a sheet feeding stage on which a set of index sheets to be inserted into the second level of a document structure is placed. The "index sheet for the third level" is an item for designating a sheet feeding stage on which a set of index sheets to be inserted into the third level of a document structure is placed. Although FIG. 5 shows designation items when the number of levels into which an index sheet is inserted is three at maximum, the number of levels into which an index sheet is inserted is not limited to three.

FIG. 6 is a diagram illustrating an exemplary document structure of print data to be processed by the image forming apparatus. The print data shown in FIG. 6 is print data received from the client PC 40 by the CPU 205 included in the image forming apparatus 10. In this example, the print data shown in FIG. 6 is document data of OutlinedDocument.pdf. The print data has a document structure including data (objects) of 20 pages and having three levels at maximum. Among the pages included in print data, the first page is a cover letter. Chapter 1 is chapter 1. Chapter 1.1 is clause 1.1. Chapter 1.2 is clause 1.2. Chapter 1.2.1 is clause 1.2.1. Chapter 1.2.2 is clause 1.2.2. Chapter 1.3 is clause 1.3. Chapter 2 is chapter 2. Chapter 2.1 is clause 2.1. Chapter 2.1.1 is clause 2.1.1. Chapter 3 is chapter 3.

Each of Chapter 1, Chapter 1.1, . . . , and Chapter 3 is an item indicating a delimiter of a document included in print data. Chapter 1 starts on the second page and ends on the fifth page. Chapter 1.1 starts on the sixth page and ends on the eighth page (the subsequent Chapters will also be likewise interpreted). The start page of a chapter may be the same as the end page of the chapter (for example, Chapter 1.2.1). Also, the end page of the previous chapter may be the same as the start page of the next chapter (for example, Chapter 1.2.2 and Chapter 1.3). Furthermore, the start pages of a plurality of chapters may be included in the same page (for example, from Chapter 1.3 to Chapter 2.1.1).

FIG. 7 shows an exemplary description of a document structure of print data shown in FIG. 6 by means of Outlines in PDF, where PDF is an abbreviation for Portable Document Format and is a file format developed by Adobe Systems Incorporated and is a trademark or a registered trademark in USA and other countries. The image forming apparatus 10 analyzes print data (PDF) received from the client PC 40 to thereby extract the document structure shown in FIG. 7.

Figure 8:
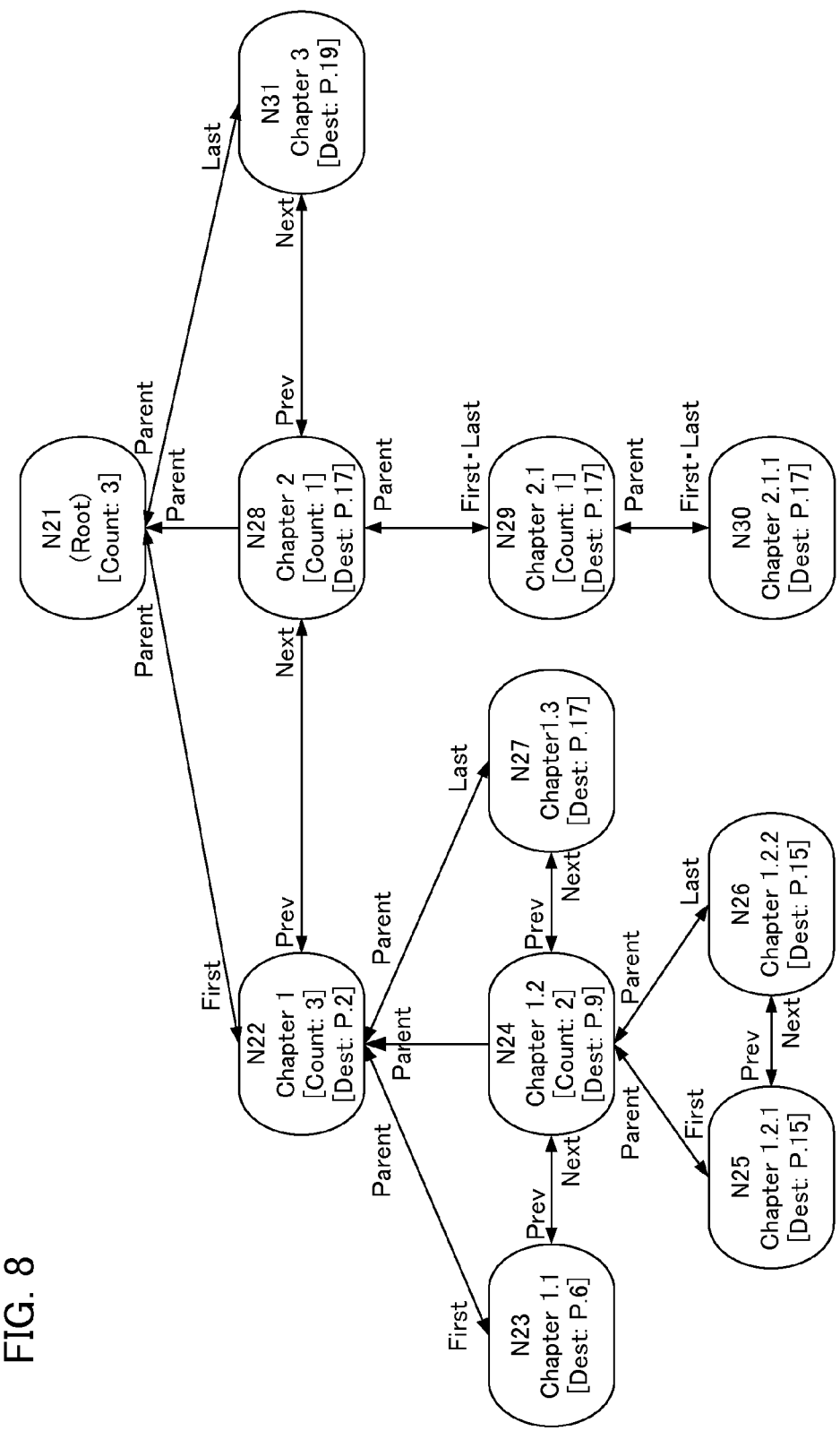
FIG. 8 is a schematic diagram illustrating an exemplary description of a document structure of print data.

FIG. 8 is a schematic diagram illustrating an exemplary description of the document structure of print data shown in FIG. 7. As shown in FIG. 8, the document structure shown in FIG. 7 has a hierarchical structure in which a root node N21 and nodes N22 to N31 are connected via link. The nodes are connected via link such as parent node (Parent), first child node (First), last child node (Last), next node (Next), and previous node (Prev). Each node has attributes such as a chapter title (e.g., Chapter 1), the number of child nodes (Count), and a reference page (Dest). The attribute "Dest" indicates a page on which a Chapter corresponding to its node among pages included in a document of print data is first presented, i.e., a page corresponding to a point at which a document is delimited by the Chapter. In the present embodiment, a page set to "Dest" of a node included in each level is an insertion point corresponding to the level.

In the example shown in FIG. 8, the nodes N22, N28, and N31 are the first level. The nodes N23, N24, N27, and N29 are the second level. The nodes N25, N26, and N30 are the third level. In other words, the CPU 205 included in the image forming apparatus 10 functions as an analysis unit that analyzes a hierarchical structure relating to items indicating delimiters for a document included in print data.

Print data and document structure to which the present invention is applied are not limited to the print data shown in FIG. 6 and the document structure shown in FIG. 7. For example, the image forming apparatus 10 of the present invention may be applied to other types of print data formats such as PDF/VT having an internal document structure. For example, the image forming apparatus 10 may refer to document structure data representing a document structure separately from print data so as to analyze the document structure of the print data.

Figure 9A:
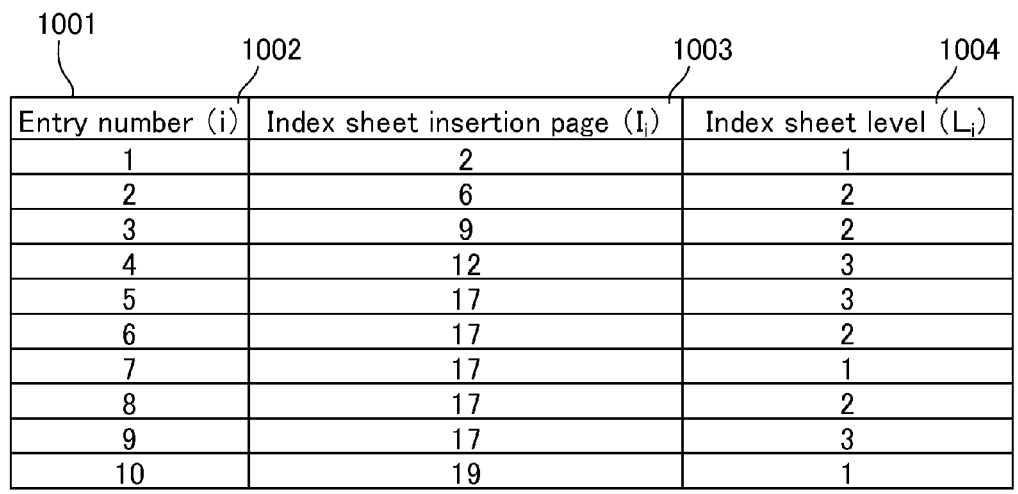
FIG. 9A shows an exemplary index sheet insertion table.
Figure 9B:
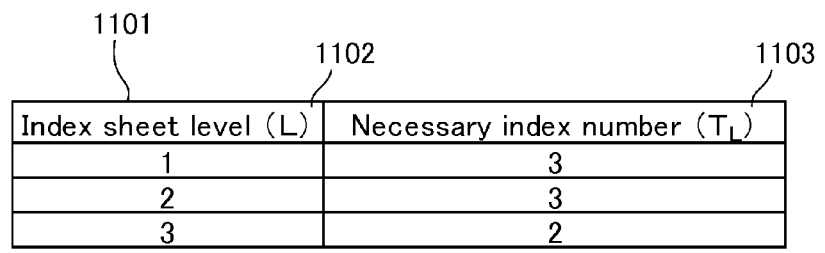
FIG. 9B shows an exemplary necessary index number table.

FIGS. 9A and 9B are diagrams illustrating an exemplary index sheet insertion table and an exemplary necessary index number table, respectively. Each of the index sheet insertion table and the necessary index number table stores information relating to insertion points at which an index sheet is inserted into a printed matter of print data. The index sheet insertion table stores the correspondence information (first correspondence information) between an insertion point at which an index sheet is inserted into a printed matter and the level of the insertion point. The necessary index number table stores the correspondence information (second correspondence information) between the level of an insertion point at which an index sheet is inserted into a printed matter and the maximum value of the number of index sheets to be inserted into the insertion point corresponding to the level. The CPU 205 included in the image forming apparatus 10 creates the index sheet insertion table and the necessary index number table based on the results of analysis of the hierarchical structure of the document and stores them in the RAM 206.

FIG. 9A shows an exemplary index sheet insertion table. An index sheet insertion table 1001 has data items such as an entry number (i) 1002, an index sheet insertion page ($I_i$) 1003, and an index sheet level ($L_i$) 1004. The entry number (i) 1002 is a number for uniquely identifying an entry (one row of data) of the index sheet insertion table 1001. The entry number starts from one and increments one by one in the order of entries. The index sheet insertion page ($I_i$) 1003 is the number of an index sheet insertion page corresponding to the ith entry. The index sheet insertion page is a page into which an index sheet is inserted. The index sheet level ($L_i$) 1004 is an index sheet level corresponding to the ith entry. The index sheet level is a level corresponding to an index sheet insertion page. For example, referring to the Dests of the nodes in the first level shown in FIG. 8, page 2, page 17, and page 19 are the index sheet insertion pages in the first level. Thus, the index sheet level "1" corresponds to these index sheet insertion pages.

The index sheet insertion table 1001 shown in FIG. 9A is created on the basis of the document structure of print data described with reference to FIG. 8. The specific method for creating an index sheet insertion table will be described below in detail with reference to FIG. 11.

FIG. 9B shows an exemplary necessary index number table. A necessary index number table 1101 has data items such as an index sheet level (L) 1102 and a necessary index number ($T_L$) 1103. The index sheet level (L) 1102 indicates the level of document data. The index sheet level (L) 1102 starts from one and increments one by one depending on the depth of level. The necessary index number ($T_L$) 1103 is the maximum value of the number of delimiters in a level L, i.e., the maximum value of the number of index sheets to be inserted into an insertion point(s) corresponding to the level L.

The necessary index number table 1101 shown in FIG. 9B is created on the basis of the document structure of print data described with reference to FIG. 8. The specific method for creating a necessary index number table will be described below in detail with reference to FIG. 12.

Figure 10:
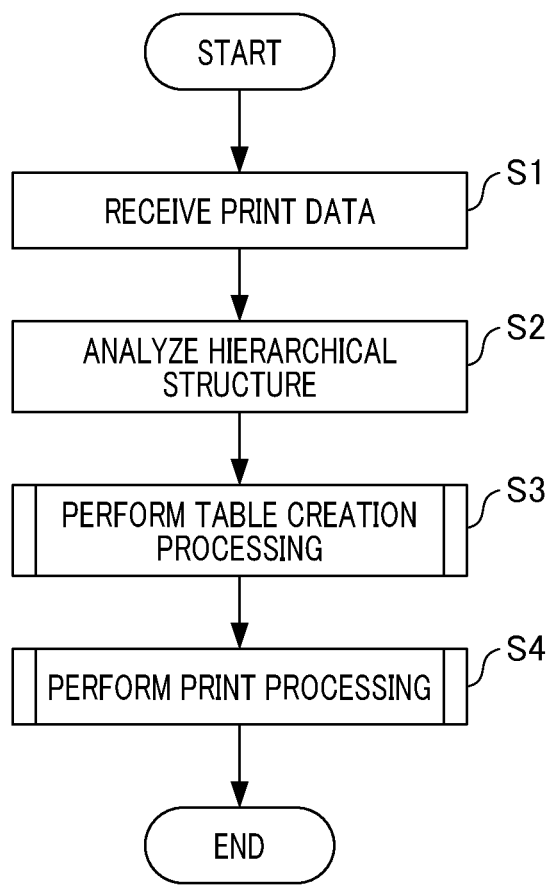
FIG. 10 is a flowchart illustrating an example of operation processing performed by the image forming apparatus.

FIG. 10 is a flowchart illustrating an example of operation processing performed by the image forming apparatus. Firstly, the CPU 205 receives print data from the client PC 40 via the network 50 and stores the received print data in the HDD 208 (step S1). Next, the CPU 205 extracts the print data stored in the HDD 208. Then, the CPU 205 analyzes the hierarchical structure which is the document structure of the extracted print data and relates to the correlation between items and pages (step S2). That is, CPU 205 functions as an analysis unit. For example, the CPU 205 acquires the hierarchical structure shown in FIG. 8 as the results of analysis.

Next, the CPU 205 executes table creation processing based on the results of analysis of the hierarchical structure in step S2 (step S3). In other words, the CPU 205 functions as a determination unit that determines an insertion point at which an index sheet is inserted into a printed matter of print data based on the results of analysis of the hierarchical structure. The table creation processing includes index sheet insertion table creation processing and necessary index number table creation processing. Then, the CPU 205 executes print processing based on the index sheet insertion table and the necessary index number table created in step S3 (step S4).

Figure 11:
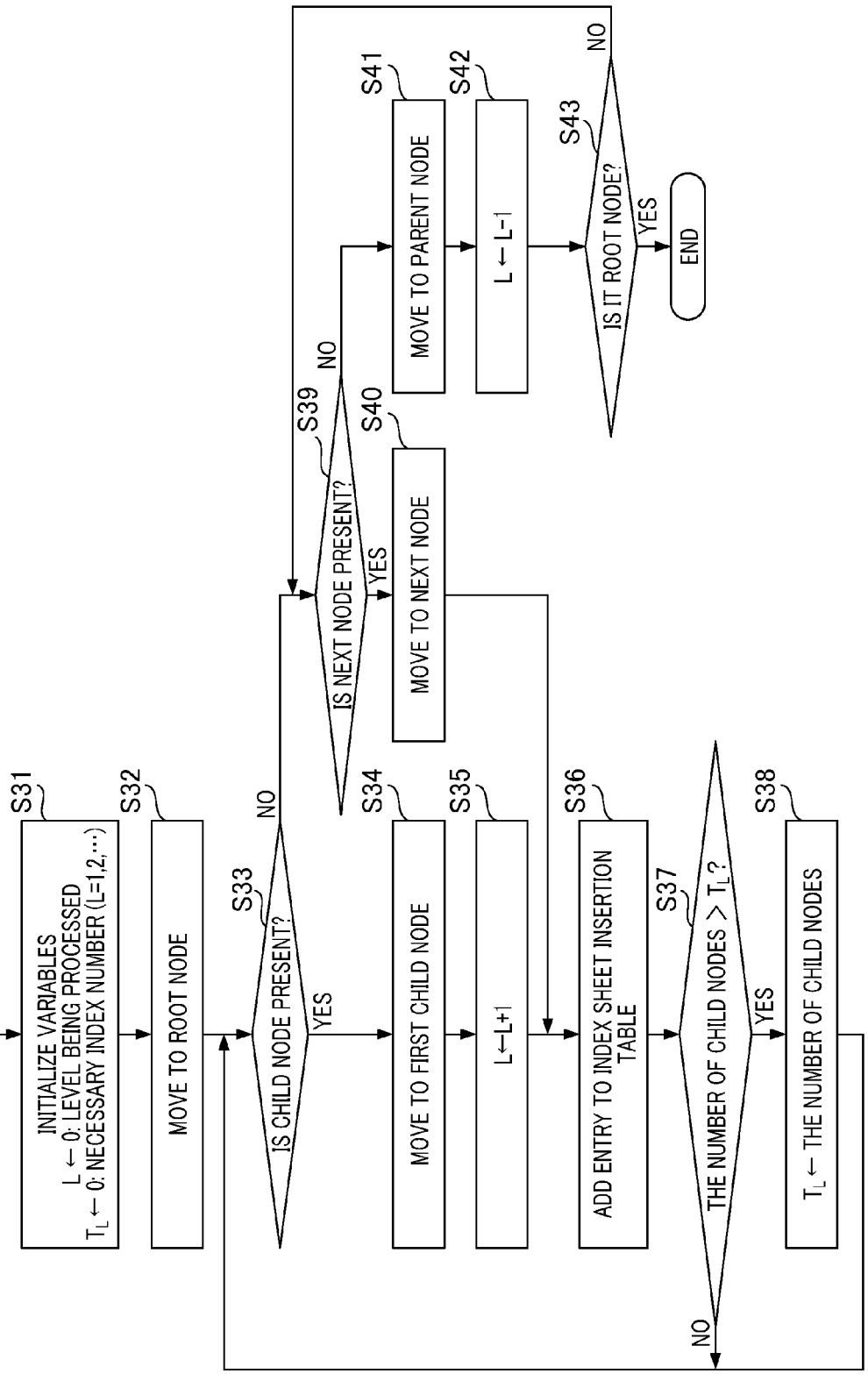
FIG. 11 is a flowchart illustrating index sheet insertion table creation processing.

FIG. 11 is a flowchart illustrating an example of table creation processing executed in step S3 of FIG. 10. In this example, the CPU 205 executes index sheet insertion table creation processing and necessary index number table creation processing based on the results of analysis of the document structure of print data shown in FIG. 8. Firstly, the CPU 205 initializes variables to be used for the subsequent processing (step S31). More specifically, the CPU 205 initializes the level L being processed to zero. Also, the CPU 205 initializes a necessary index number $T_L$ (L=1, 2, . . . ) to zero.

Next, the CPU 205 changes a node to be processed to a root node (step S32). In the example of description of the document structure shown in FIG. 9, the root node is the node N21. In the example of the PDF format shown in FIG. 7, an object having the attribute "Outlines" in "Type" is a root node.

Next, the CPU 205 determines whether or not a node to be processed has a child node (step S33). More specifically, the CPU 205 determines whether or not "Count" of a node to be processed is one or greater. When "Count" of a node to be processed is one or greater, the CPU 205 determines that a node to be processed has a child node. When "Count" of a node to be processed is not greater than one or greater, the CPU 205 determines that a node to be processed has no child node.

When the CPU 205 determines that a node to be processed has a child node, the process advances to step S34. When the CPU 205 determines that a node to be processed has no child node, the process advances to step S39.

In step S34, the CPU 205 changes a node to be processed to the first child node (step S34). The first child node is a node indicated by the "First" link of a node to be processed. Next, the CPU 205 increments the level L being processed by one (step S35).

Next, the CPU 205 adds an entry to the index sheet insertion table 1001 (step S36). More specifically, the CPU 205 sets a value of which the preceding entry number is incremented by one to the entry number (i) 1002 corresponding to the entry. Also, the CPU 205 sets the reference page (Dest) of a node to be processed to the index sheet insertion page ($I_i$). Further, the CPU 205 sets the level L being processed to the index sheet level ($L_i$) 1004.

Next, the CPU 205 determines whether or not the number (Count) of child nodes of a node to be processed is greater than the necessary index number ($I_L$) 1103, which is stored in the necessary index number table 1101, corresponding to the level L (step S37). When the CPU 205 determines that the number of child nodes of a node to be processed is greater than the necessary index number ($I_L$) 1103 corresponding to the level L, the process advances to step S38. When the CPU 205 determines that the number of child nodes of a node to be processed is not greater than the necessary index number ($I_L$) 1103 corresponding to the level L, the process returns to step S33, and the CPU 205 continues processing for the subsequent nodes.

In step S38, the CPU 205 sets the necessary index number ($I_L$) 1103, which is stored in the necessary index number table 1101, corresponding to the level L to the number (Count) of child nodes of a node to be processed (step S38). Then, the process returns to step S33, and the CPU 205 continues processing for the subsequent nodes.

In step S39, the CPU 205 determines whether or not there is a next node for a node to be processed (step S39). The next node is a node indicated by the "Next" link of a node to be processed. When the CPU 205 determines that there is a next node for a node to be processed, the CPU 205 changes a node to be processed to the next node (step S40). Then, the process advances to step S36, and the CPU 205 adds an entry to the index sheet insertion table 1001.

When the CPU 205 determines that there is no next node for a node to be processed, the CPU 205 changes a node to be processed to a parent node (step S41). The parent node is a node indicated by the "Parent" link of a node to be processed. Next, the CPU 205 decrements the level L being processed by one (step S42).

Next, the CPU 205 determines whether or not a node to be processed is a root node (step S43). More specifically, the CPU 205 determines whether or not a node to be processed is an object having the attribute "Outlines" in "Type". When the CPU 205 determines that a node to be processed is an object having the attribute "Outlines" in "Type", the CPU 205 determines that the node to be processed is a root node. When the CPU 205 determines that a node to be processed is not an object having the attribute "Outlines" in "Type", the CPU 205 determines that the node to be processed is not a root node.

When the CPU 205 determines that the node to be processed is not a root node, the process returns to step S39. When the CPU 205 determines that the node to be processed is a root node, the process is ended.

Figure 12:
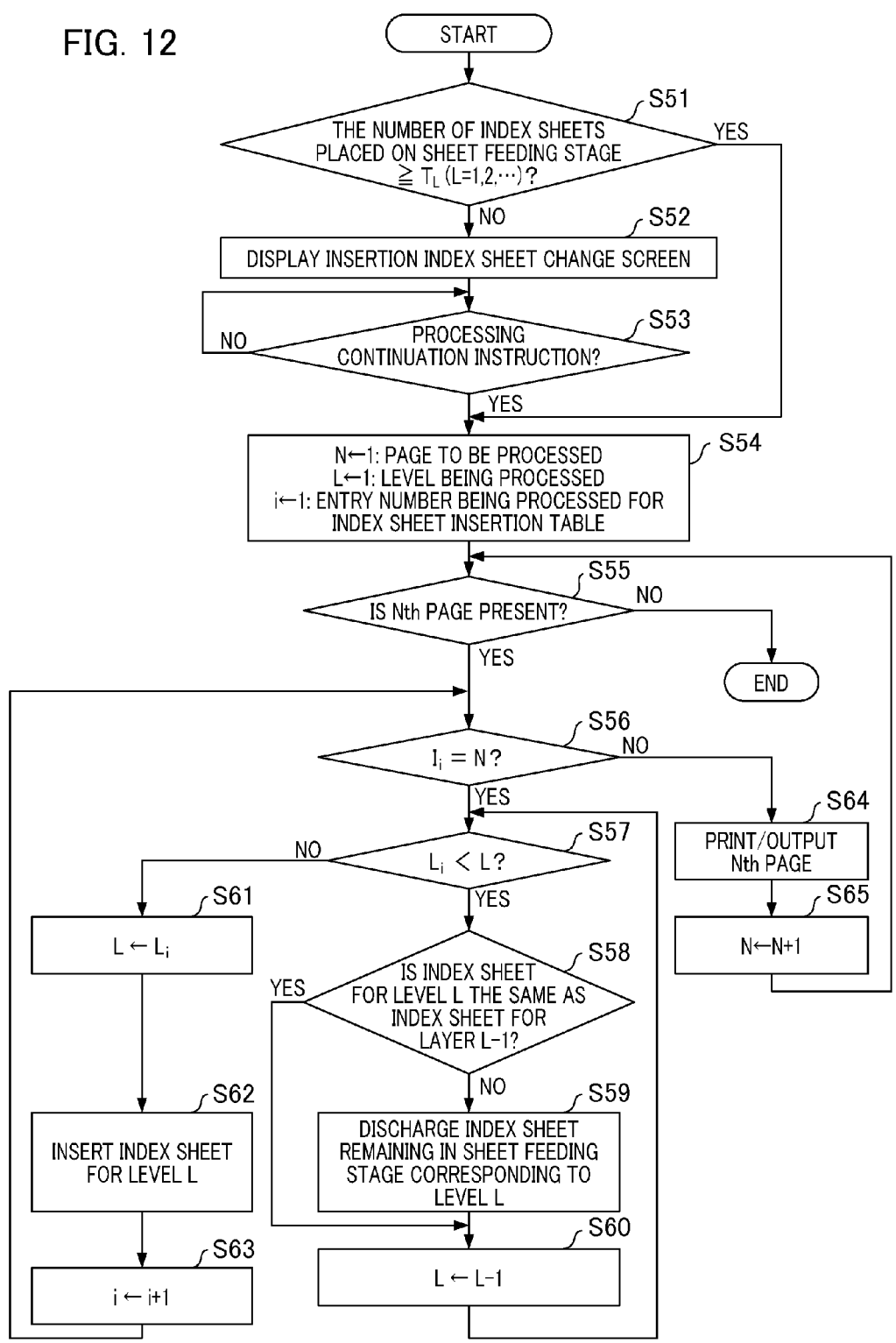
FIG. 12 is a flowchart illustrating in detail an example of print processing.

FIG. 12 is a flowchart illustrating in detail an example of print processing. A description will be given of the first embodiment with reference to FIG. 12. In the first embodiment, as shown in FIG. 5, a user of the client PC 40 designates a sheet feeding stage 1 as the sheet feeding stage corresponding to the first level on the job input screen. Also, a user designates a sheet feeding stage 2 as the sheet feeding stage corresponding to the second level. Further, a user designates a sheet feeding stage 3 as the sheet feeding stage corresponding to the third level.

The CPU 205 executes the following processing based on the number of index sheets placed on sheet feeding stages for index sheets for use in the respective levels and the necessary index number ($T_L$) stored in the necessary index number table 1101 designated on the job input screen. The number of index sheets placed on each sheet feeding stage is registered in advance.

For all of the levels L, the CPU 205 determines whether or not the number of index sheets placed on a sheet feeding stage designated as the sheet feeding stage corresponding to the level L is equal to or greater than the necessary index number ($T_L$) (step S51). In other words, the CPU 205 executes the following processing based on designation information in response to the designation operation on the job input screen and information stored in the necessary index number table 1101. The CPU 205 determines whether or not there is a sheet feeding stage in which the number of index sheets placed on the sheet feeding stage is less than the maximum value of the number of index sheets corresponding to the level corresponding to the sheet feeding stage among the sheet feeding stages designated by designation information.

For all of the levels L, when the number of index sheets placed on a sheet feeding stage designated as the sheet feeding stage corresponding to the level L is equal to or greater than the necessary index number ($I_L$), the process advances to step S54. For any one of the levels L, when the number of index sheets placed on a sheet feeding stage designated as the sheet feeding stage corresponding to the level L is less than the necessary index number ($I_L$), the process advances to step S52.

Next, the CPU 205 displays the insertion index sheet change screen on the operation unit 210 (FIG. 4A), and causes a user to select an index sheet to be inserted (step S52). In other words, when the CPU 205 determines that there is a sheet feeding stage in which the number of index sheets placed on the sheet feeding stage is less than the maximum value of the number of index sheets corresponding to the level corresponding to the sheet feeding stage, the CPU 205 displays the fact that the number of index sheets placed on the sheet feeding stage is insufficient.

Figure 13:
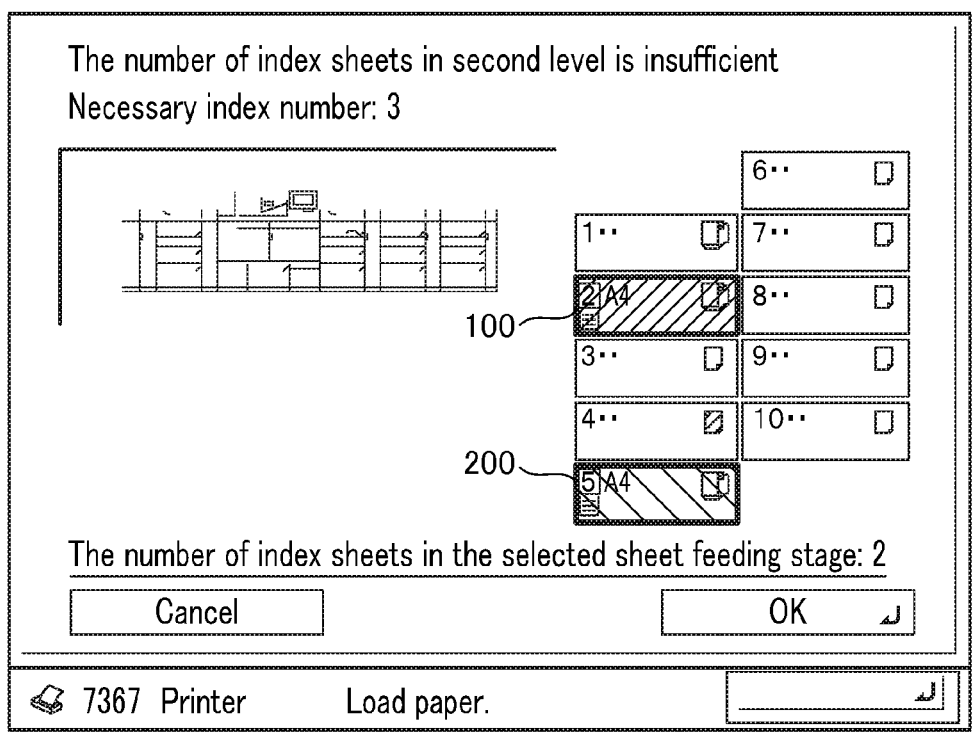
FIG. 13 is a diagram illustrating an exemplary insertion index sheet change screen.

FIG. 13 is a diagram illustrating an exemplary insertion index sheet change screen. In this example, the necessary index number ($T_2$) is three. Also, the number of index sheets placed on the sheet feeding stage 2 of the designated second level is two. Thus, the CPU 205 displays the fact that the number of index sheets for the second level is insufficient on the insertion index sheet change screen so as to prompt a user to set the necessary index number (three) of index sheets.

Icons indicating the respective sheet feeding stages are displayed on the insertion index sheet change screen shown in FIG. 13. In this example, the CPU 205 displays an icon 100 indicating the sheet feeding stage 2 in the display format such that the number of index sheets placed on the sheet feeding stage 2 is insufficient. In this example, it is assumed that the number of index sheets placed on a sheet feeding stage 5 is equal to or greater than the necessary index number of three. Thus, the CPU 205 displays an icon 200 indicating the sheet feeding stage 5 in the display format such that the sheet feeding stage 5 can be replaced with the sheet feeding stage 2. In other words, the CPU 205 displays information indicating a sheet feeding stage in which the number of index sheets placed on the sheet feeding stage is equal to or greater than the maximum value of the number of index sheets corresponding to the level corresponding to the sheet feeding stage. When a user provides a processing continuation instruction, the user presses down an OK button on the insertion index sheet change screen.

Next, the CPU 205 determines whether or not a processing continuation instruction has been provided by a user (step S53). When a processing continuation instruction has not been provided by a user, the process returns to step S53.

When a processing continuation instruction has been provided by a user, the process advances to step S54.

In step S54, the CPU 205 initializes variables to be used for the subsequent processing (step S54). More specifically, the CPU 205 initializes the page N to be processed to one. Also, the CPU 205 initializes the level L being processed to one. Further, the CPU 205 initializes the entry number i being processed for the index sheet insertion table to one.

Next, the CPU 205 determines whether or not the Nth page is present in print data (step S55). When the Nth page is absent in print data, the process is ended. When the Nth page is present in print data, the process advances to step S56, and the CPU 205 continues print processing for the Nth page.

In step S56, the CPU 205 determines whether or not the ith index sheet insertion page ($I_i$) 1003 is equal to the page N to be processed (step S56). When the index sheet insertion page ($I_i$) 1003 is equal to the page N to be processed, the process advances to step S57 and proceeds to index sheet insertion processing. When the index sheet insertion page ($I_i$) 1003 is unequal to the page N to be processed, the process advances to step S64 and proceeds to print processing for the Nth page.

In step S57, the CPU 205 determines whether or not the ith index sheet level ($L_i$) 1004 is less than the level L being processed (step S57). When the ith index sheet level ($L_i$) 1004 is less than the level L being processed, this means that a delimiter of a document, i.e., an insertion point at which an index sheet is inserted into a printed matter is present at the upper level of the current level L. In other words, in this case, a level corresponding to an insertion point at which an index sheet is inserted into a printed matter is switched from a lower level to an upper level. Thus, in this case, the process proceeds to index sheet discharge processing subsequent to step S58. When the ith index sheet level ($L_i$) 1004 is equal to or greater than the level L being processed, the process proceeds to index sheet insertion processing subsequent to step S61.

In step S58, the CPU 205 determines whether or not an index sheet corresponding to the current level L is the same as an index sheet corresponding to the level L−1 which is a level one-level higher than the level L (step S58). In other words, the CPU 205 determines whether or not an index sheet inserted into the insertion point of the lower level is the same as an index sheet to be inserted into the insertion point of the upper level. More specifically, the CPU 205 determines whether or not a sheet feeding stage corresponding to the level L is the same as a sheet feeding stage corresponding to the level L−1 based on information about sheet feeding stages corresponding to the respective levels designated on the job input screen.

When a sheet feeding stage corresponding to the level L is the same as a sheet feeding stage corresponding to the level L−1, the CPU 205 determines that an index sheet corresponding to the level L is the same as an index sheet corresponding to the level L−1. When a sheet feeding stage corresponding to the level L is not the same as a sheet feeding stage corresponding to the level L−1, the CPU 205 determines that an index sheet corresponding to the level L is not the same as an index sheet corresponding to the level L−1.

When an index sheet corresponding to the level L is the same as an index sheet corresponding to the level L−1, the process advances to step S60. When an index sheet corresponding to the level L is not the same as an index sheet corresponding to the level L−1, the process advances to step S59. Then, the CPU 205 discharges an index sheet remaining on a sheet feeding stage corresponding to the level L (step S59). In other words, the CPU 205 functions as a discharge unit that discharges an index sheet which is not inserted into the printed matter among index sheets included in an index set placed on the sheet feeding stage designated by designation information. Then, when the CPU 205 determines that an index sheet inserted into the insertion point of the lower level is not the same as an index sheet to be inserted into the insertion point of the upper level, the CPU 205 discharges an index sheet which is not inserted into the insertion point of the lower level. As a result of index sheet discharge processing, when an index sheet corresponding to the level L is inserted again in the subsequent processing, the first index sheet is inserted. Next, the CPU 205 decrements the level L being processed by one, and the process returns to step S59.

In step S61, the CPU 205 sets the level L being processed to the ith index sheet level ($L_i$) 1004 (step S61). The CPU 205 inserts one index sheet into the printed matter from a sheet feeding stage corresponding to the level L using the printer engine 202 (step S62). The CPU 205 inserts an index sheet at an insertion point corresponding to the level L based on information stored in the index sheet insertion table 1001. Then, the CPU 205 increments the entry number i being processed by one, and the process returns to step S56.

In step S64, the CPU 205 provides a printout of the Nth page using the printer engine 202 (step S64). Then, the CPU 205 increments the page N to be processed by one (step S65), and the process returns to step S55.

As a result of print processing described above, a printed matter into which index sheets have been inserted at insertion points corresponding to the content of the index sheet insertion table 1001 is output. In other words, the CPU 205 functions as an output unit that inserts index sheets into a printed matter at the insertion points thereof and outputs the resulting printed matter based on information stored in the index sheet insertion table and the necessary index number table.

Figure 14:
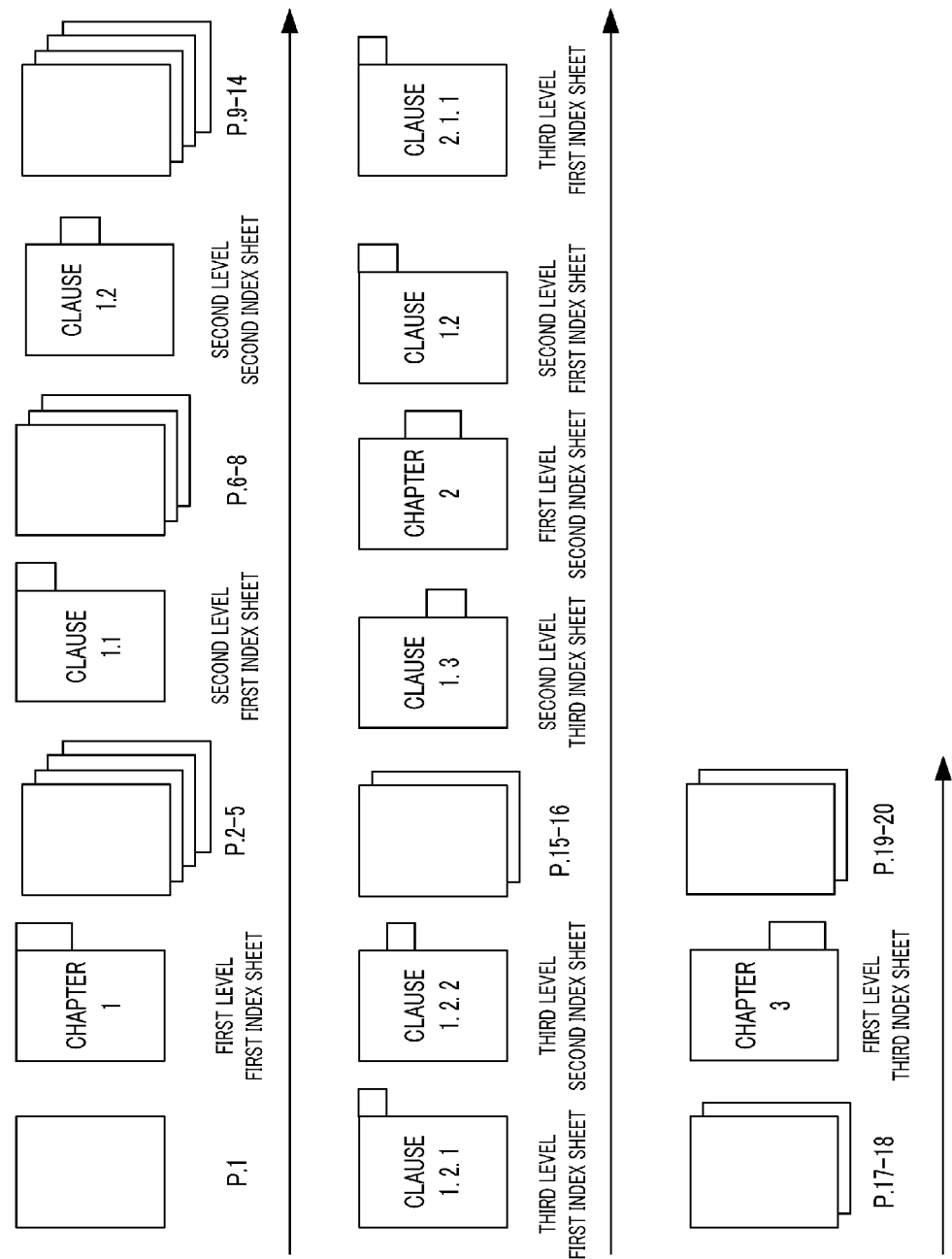
FIG. 14 shows an exemplary output of a printed matter according to a first embodiment.

FIG. 14 shows an exemplary output of a printed matter according to the first embodiment. As shown in FIG. 14, the index portion of an index sheet corresponding to clause 1.2.1 is placed at the leading position and the index portion of an index sheet corresponding to clause 2.1.1 is also placed at the leading position. In other words, the position of the index portion of an index sheet corresponds one by one relationship with that of the leading clause in the third level. In the present embodiment, a sheet feeding stage corresponding to the second level is different from a sheet feeding stage corresponding to the third level (FIG. 5). Thus, after inserting and outputting an index sheet corresponding to clause 1.2.2 shown in FIG. 14, the CPU 205 executes processing for discharging an index sheet corresponding to the third level prior to proceeding to processing for inserting an index sheet corresponding to clause 1.3 (steps S58 and S59 in FIG. 12). In this way, the number of clause in the third level corresponds one by one relationship with the position of an index portion thereof.

A description will be given below of the effects of the first embodiment. In the prior art, when index sheets are inserted into a print job having a multi-level document structure, a user needs to explicitly designate which page of the print job corresponds to a chapter/clause delimiter. Thus, when print data having a complex document structure or print data having multiple chapters/clauses is printed, a workload of a user significantly increases, resulting in a reduction in printing efficiency and a cause of operational mistakes. According to the first embodiment, when index sheets are inserted into a print job having a multi-level document structure, the positions of chapter/clause delimiters can be detected from the document structure so as to insert index sheets suitable for the multi-level document structure. In this way, a user does not need to explicitly designate which page of the print job corresponds to a chapter/clause delimiter, and thus, a desired output matter can be obtained quicker than prior art techniques.

In the prior art, even when the number of chapter/clause delimiters is greater than the number of tabs on a set of index sheets, printing is performed using index sheets of the second set or subsequent sets without providing any warning. Thus, in the case of a print job in which the number of chapter/clause delimiters is significantly greater than the number of tabs on a set of index sheets, the positions of tabs are gone round in circles many times, and thus, a user who picks up an output matter may take time to find out the intended chapter/clause. According to the first embodiment, the number of chapter/clause delimiters can be detected prior to the start of printing such that a user can select index sheets in which the number of tabs on one set of the index sheets is greater than the number of chapter/clause delimiters. Also, according to the first embodiment, the position of a tab on an index sheet can be set to correspond one-by-one relationship with the number of a chapter/clause as described with reference to FIG. 14. Thus, an output matter of which the intended chapter/clause can be readily referenced by a user may be obtained.

In the prior art, when a plurality of chapter/clause delimiters is included in one page, printing is performed by inserting only one index sheet into a printed matter. Consequently, in the case of a print job in which a plurality of chapter/clause delimiters is included in one page, the positions of the tabs may be offset from one another, and thus, a user who picks up an output matter may take time to find out the intended chapter/clause. According to the first embodiment, when a plurality of chapter/clause delimiters is included in one page, printing may be performed by inserting a plurality of index sheets corresponding to the chapter/clause delimiters in front of the page.

For example, in the index sheet insertion table 1001 shown in FIG. 9A, assume the case where the entry number i being processed sequentially shifts from seven to eight and from eight to nine. In this case, the index sheet level ($L_i$) sequentially shifts from the first level to the second level and from the second level to the third level. Thus, the determination by determination processing in step S57 shown in FIG. 12 is "NO". Then, in step S62, an index sheet for the second level (an index sheet for clause 2.1 shown in FIG. 14) and an index sheet for the third level (an index sheet for clause 2.1.1 shown in FIG. 14) are inserted in sequence.

Figure 15:
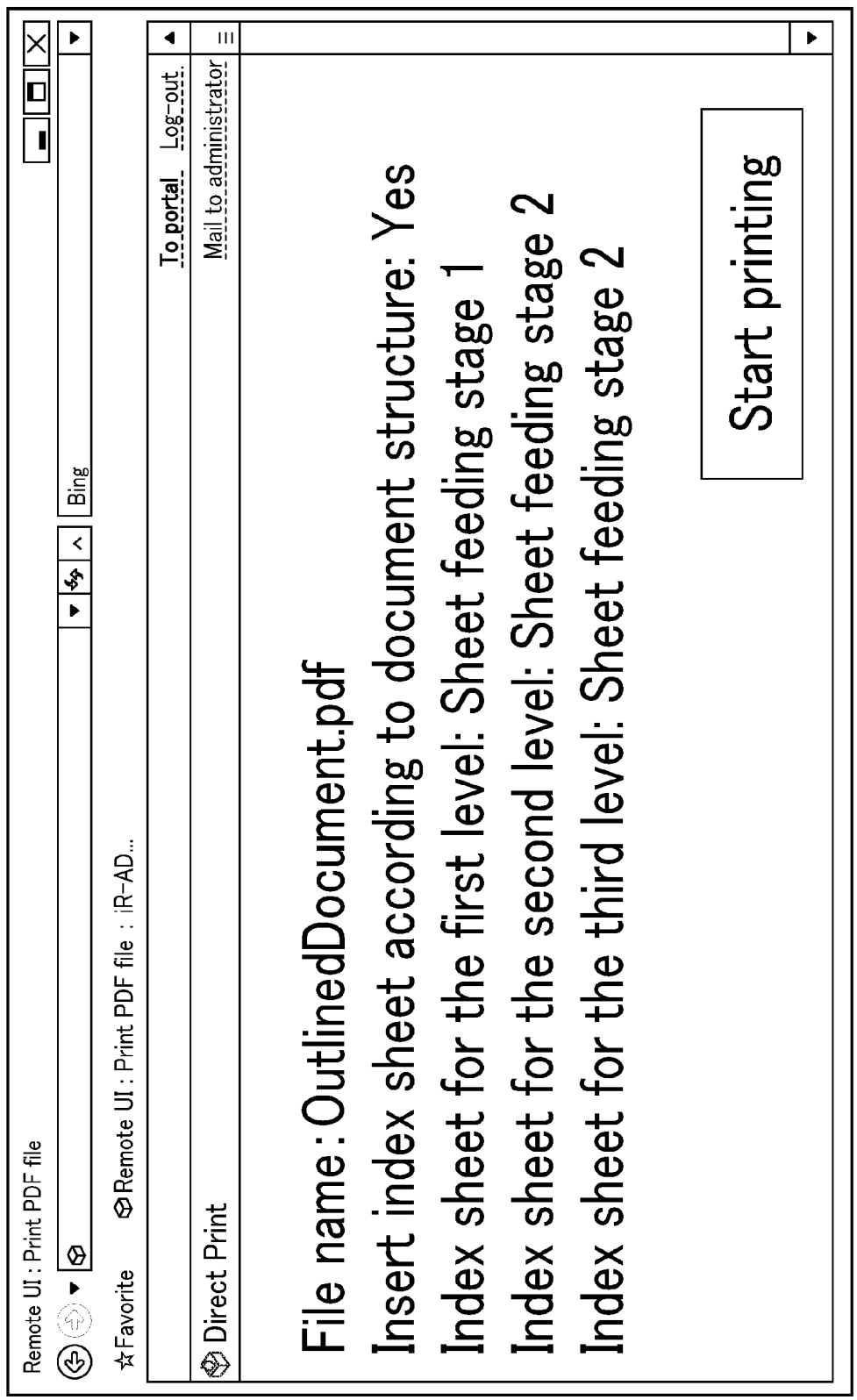
FIG. 15 is a diagram illustrating an exemplary job input screen according to a second embodiment.

FIG. 15 is a diagram illustrating an exemplary job input screen according to a second embodiment. In the second embodiment, a user of the client PC 40 designates the sheet feeding stage 1 as the sheet feeding stage corresponding to the first level on the job input screen. Also, a user designates the sheet feeding stage 2 as the sheet feeding stage corresponding to the second level. Further, a user designates the sheet feeding stage 2 as the sheet feeding stage corresponding to the third level.

Figure 16:
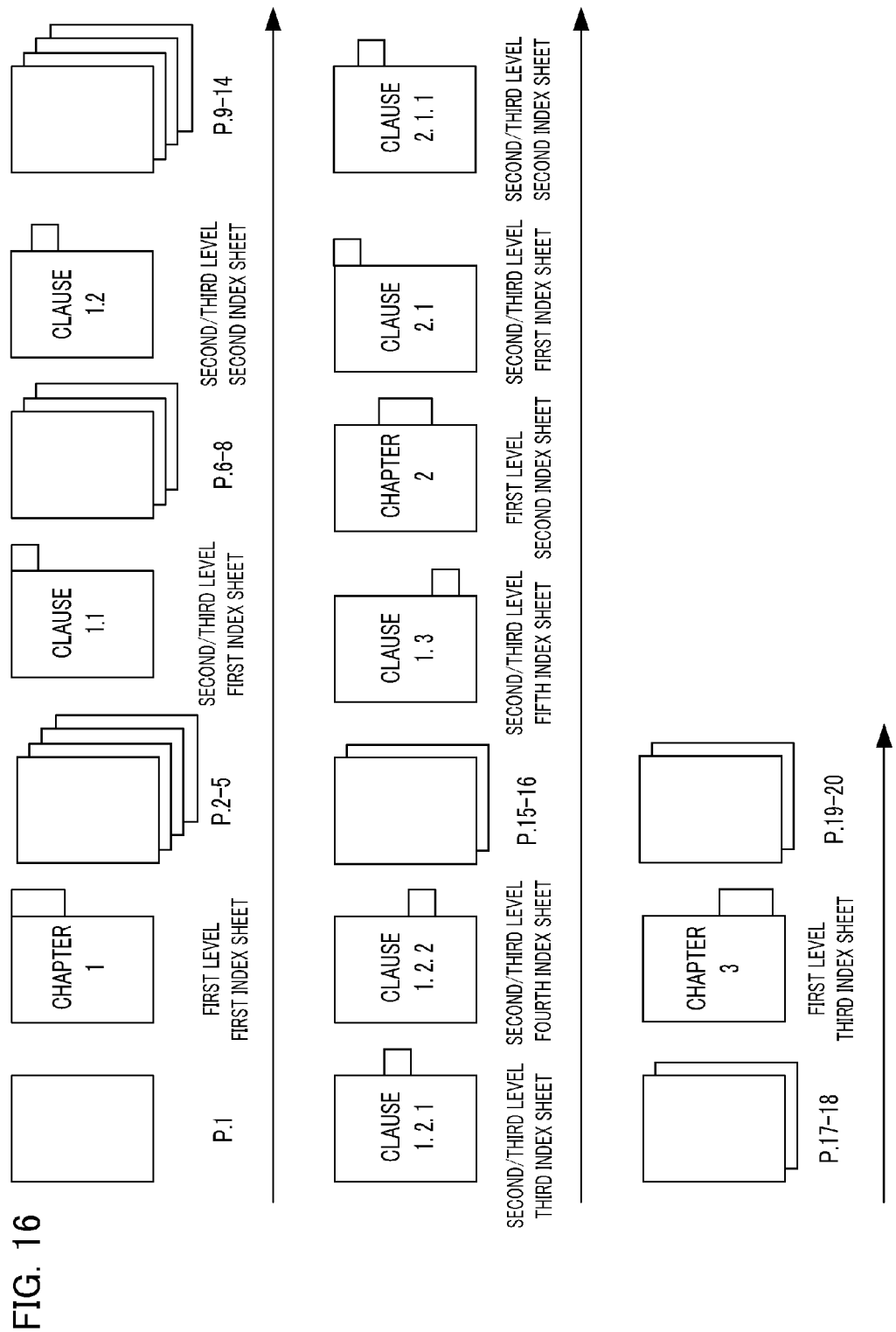
FIG. 16 shows an exemplary output of a printed matter according to the second embodiment.

FIG. 16 shows an exemplary output of a printed matter according to the second embodiment. Also, in the second embodiment, the image forming apparatus 10 executes the processing shown in the flowchart of FIG. 12 as in the first embodiment. Here, in the second embodiment, a sheet feeding stage corresponding to the second level and a sheet feeding stage corresponding to the third level are the same sheet feeding stage 2 as described with reference to FIG. 15. Thus, the determination by determination processing in step S58 to be executed subsequent to step S57 (when the index sheet level ($L_i$) shifts from the third level to the second level, Yes in step S57 shown in FIG. 12) is "YES". In this way, an index sheet is suppressed from being discharged. Consequently, index sheets are inserted such that the tabs on the index sheets are positioned in sequence over the second level and the third level.

In the prior art, it is assumed that multiple types of index sheets having a different tab size, color, and the like are used for each level of a document. Thus, an output matter having a multi-level distinction may not be created using only a relatively few types of index sheets. According to the second embodiment, when the same type of index sheets are used for the successive levels, the index sheet is suppressed from being discharged during switching between the levels. In this way, index sheets are inserted such that the tabs on the index sheets are positioned in sequence over the successive levels. Consequently, an output matter having a multi-level distinction may be created using only a relatively few types of index sheets.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-138087 filed on Jun. 22, 2011, which is hereby incorporated by reference herein in its entirety.

What is claimed is:

1. An image forming apparatus comprising:
a reception unit configured to receive print data of a document having a plurality of hierarchical level structures and designation information, wherein the designation information instructs that a first sheet feeding unit is used for feeding an index sheet of a first hierarchical level and a second sheet feeding unit is used for feeding an index sheet of a second hierarchical level;
a determination unit configured to determine the hierarchical level of a page to be processed of the print data and whether or not the page to be processed is a page to be inserted in the document;
a control unit configured to control feeding a first index sheet from the first sheet feeding unit based on the designation information in a case where, as a result of the determination by the determination unit, the page to be processed of the print data corresponds to the first hierarchical level of the document and the page to be processed of the print data is the page to be inserted in the document, and feeding a second index sheet from the second sheet feeding unit based on the designation information in a case where, as the result of the determination by the determination unit, the page to be processed of the print data corresponds to the second hierarchical level of the document and the page to be processed of the print data is the page to be inserted in the document; and
an output unit configured to output a printed matter in which the first index sheet and the second index sheet are inserted,
wherein the reception unit, the determination unit, the control unit and the output unit are implemented by a processor and a memory.

2. A method for controlling an image forming apparatus, the method comprising:
receiving print data of a document having a plurality of hierarchical level structures and designation information, wherein the designation information instructs that a first sheet feeding unit is used for feeding an index sheet of a first hierarchical level and a second sheet feeding unit is used for feeding an index sheet of a second hierarchical level;
determining the hierarchical level of a page to be processed of the print data and whether or not the page to be processed is a page to be inserted in the document;
controlling feeding of a first index sheet from the first sheet feeding unit based on the designation information in a case where, as a result of the determining, the page to be processed of the print data corresponds to the first hierarchical level of the document and the page to be processed of the print data is the page to be inserted in the document, and controlling feeding of a second index sheet from the second sheet feeding unit based on the designation information in a case where, as the result of the determining, the page to be processed of the print data corresponds to the second hierarchical level of the document and the page to be processed of the print data is the page to be inserted in the document; and
outputting a printed matter in which the first index sheet and the second index sheet are inserted,
wherein a processor and a memory implement the reception step, the determining step, the controlling step and the output step.

3. A non-transitory computer-readable storage medium on which is stored a computer program to be executed by a processor of an image forming apparatus, the program comprising:
code for receiving print data of a document having a plurality of hierarchical level structures and designation information, wherein the designation information instructs that a first sheet feeding unit is used for feeding an index sheet of a first hierarchical level and a second sheet feeding unit is used for feeding an index sheet of a second hierarchical level;
code for determining the hierarchical level of a page to be processed of the print data and whether or not the page to be processed is a page to be inserted in the document;
code for controlling feeding of a first index sheet from the first sheet feeding unit based on the designation information in a case where, as a result of the determining, the page to be processed of the print data corresponds to the first hierarchical level of the document and the page to be processed of the print data is the page to be inserted in the document, and controlling feeding of a second index sheet from the second sheet feeding unit based on the designation information in a case where, as the result of the determining, the page to be processed of the print data corresponds to the second hierarchical level of the document and the page to be processed of the print data is the page to be inserted in the document; and code for outputting a printed matter in which the first index sheet and the second index sheet are inserted.

4. The image forming apparatus according to claim 1, further comprising a discharge unit configured to discharge an index sheet remaining in the first sheet feeding unit in a case where the determination unit determines that the hierarchical level of the page to be processed is changed from the first hierarchical level to the second hierarchical level which is less than the first hierarchical level.

5. The image forming apparatus according to claim 1, further comprising:

an index sheet determination unit configured to determine whether or not an index sheet is insufficient; and a display control unit configured to identifiably display a sheet feeding unit, which includes an index sheet that is sufficient, among a plurality of sheet feeding units in a case where the index sheet determination unit determines that the index sheet is insufficient.

6. The method for controlling an image forming apparatus according to claim 2, further comprising discharging an index sheet remaining in the first sheet feeding unit in a case where the hierarchical level of the page to be processed is changed from the first hierarchical level to the second hierarchical level which is less than the first hierarchical level.

7. The method for controlling an image forming apparatus according to claim 2, further comprising:

determining whether or not an index sheet is insufficient; and displaying identifiably a sheet feeding unit, which includes an index sheet that is sufficient, among a plurality of sheet feeding units in a case where the determining step determines that the index sheet is insufficient.

8. The non-transitory computer-readable storage medium according to claim 3, further comprising code for discharging an index sheet remaining in the first sheet feeding unit in a case where the hierarchical level of the page to be processed is changed from the first hierarchical level to the second hierarchical level which is less than the first hierarchical level.

9. The non-transitory computer-readable storage medium according to claim 3, further comprising:

code for determining whether or not an index sheet is insufficient; and code for displaying identifiably a sheet feeding unit, which includes an index sheet that is sufficient, among a plurality of sheet feeding units in a case where the determining step determines that the index sheet is insufficient.

* * * * *